United States Patent
Bex et al.

(10) Patent No.: US 9,387,825 B2
(45) Date of Patent: Jul. 12, 2016

(54) WIPING DEVICE, IN PARTICULAR WIPING DEVICE FOR A MOTOR VEHICLE PANE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 14/129,610

(22) PCT Filed: May 22, 2012

(86) PCT No.: PCT/EP2012/059473
§ 371 (c)(1),
(2), (4) Date: Dec. 27, 2013

(87) PCT Pub. No.: WO2013/000629
PCT Pub. Date: Jan. 3, 2013

(65) Prior Publication Data
US 2014/0137359 A1    May 22, 2014

(30) Foreign Application Priority Data
Jun. 28, 2011   (DE) .......................... 10 2011 078 169

(51) Int. Cl.
*B60S 1/38*   (2006.01)
*B60S 1/04*   (2006.01)

(52) U.S. Cl.
CPC .............. *B60S 1/0408* (2013.01); *B60S 1/381* (2013.01); *B60S 1/3881* (2013.01)

(58) Field of Classification Search
CPC ...... B60S 1/3806; B60S 1/381; B60S 1/3881; B60S 1/0408
USPC ........................................ 15/250.201, 250.43
See application file for complete search history.

(56) References Cited

U.S. PATENT DOCUMENTS

| | | | | |
|---|---|---|---|---|
| 7,370,385 | B2 * | 5/2008 | Chiang ...................... | 15/250.43 |
| 7,540,061 | B1 * | 6/2009 | Huang ...................... | 15/250.201 |
| 2003/0159229 | A1 | 8/2003 | Weiler et al. | |
| 2007/0174989 | A1 * | 8/2007 | Moll et al. ............... | 15/250.201 |
| 2009/0089956 | A1 * | 4/2009 | De Block et al. ......... | 15/250.201 |
| 2010/0218333 | A1 * | 9/2010 | Ritt .......................... | 15/250.201 |
| 2011/0247167 | A1 * | 10/2011 | Huang ...................... | 15/250.32 |

FOREIGN PATENT DOCUMENTS

| | | |
|---|---|---|
| CN | 1569531 | 1/2005 |
| DE | 20221548 | 6/2006 |
| DE | 102006020524 | 11/2007 |
| FR | 2923785 | 5/2009 |
| FR | 2943020 | 9/2010 |
| KR | 20100059580 | 6/2010 |
| WO | 2004076252 | 9/2004 |
| WO | WO 2004/076251 A1 * | 9/2004 |

OTHER PUBLICATIONS

International Search Report for Application No. PCT/EP2012/059473 dated Jul. 16, 2013 (3 pages).

* cited by examiner

*Primary Examiner* — Gary Graham
(74) *Attorney, Agent, or Firm* — Michael Best & Friedrich LLP (57) ABSTRACT

The invention relates to a wiping device, in particular a wiping device for a motor vehicle pane, comprising a retaining unit (10a-10e) that has a retaining element (12a-12e) with a longitudinal guide channel (14a-14e) for guiding a spring element (16a-16e), and comprising a spoiler unit (22a-22e). According to the invention, the spoiler unit (22a-22e) lies at least partially at the side of the retaining element (12a-12e) in the region of the longitudinal guide channel (14a-14e).

10 Claims, 5 Drawing Sheets

WIPING DEVICE, IN PARTICULAR WIPING DEVICE FOR A MOTOR VEHICLE PANE

BACKGROUND OF THE INVENTION

A wiping device, in particular a wiping device for a motor vehicle pane having a retention unit, which has a retention element having a longitudinal guiding channel for guiding a resilient element and having a wind deflector unit is already known.

SUMMARY OF INVENTION

The invention is based on a wiping device, in particular a wiping device for a motor vehicle pane, having a retention unit which has a retention element having a longitudinal guiding channel for guiding a resilient element, and having a wind deflector unit.

It is proposed that the wind deflector unit be at least partially in lateral abutment with the retention element in the region of the longitudinal guiding channel, whereby gaps in a main flow region of the wind deflector unit and/or noises and flow resistances can be prevented. A "retention unit" in this context is intended to be understood in particular to refer to a unit which is provided to connect the wind deflector unit to a wiper blade. A "wiper blade" in this context is intended in particular to refer to a blade which is provided to wipe a vehicle pane. The wiper blade is preferably constructed from a rubber material. A "retention element" in this context is intended to refer in particular to an element which is provided to connect a wind deflector unit, a resilient element and a wiper blade in a positive-locking manner. A "longitudinal guiding channel" in this context is intended in particular to refer to a guiding channel which extends parallel with a longitudinal direction of the retention unit. The longitudinal guiding channel preferably comprises a free space and at least one channel wall which delimits the free space. A "longitudinal direction" in this context is intended in particular to refer to a direction which extends substantially parallel with a longitudinal extent of the retention element. A "longitudinal extent" in this context is intended in particular to refer to a largest possible extent. The term "substantially" in this context is intended in particular to refer to a deviation of less than 10°, preferably less than 5°. An "extent" of an element in this context is intended in particular to refer to a maximum spacing of two points of a perpendicular projection of the element on a plane. A "resilient element" in this context is intended to be understood in particular to refer to a resilient element, which has at least one extent which can be resiliently modified in a normal operating state by at least 10%, in particular by at least 20%, preferably by at least 30% and in a particularly advantageous manner by at least 50%, and which produces in particular a counter-force which is dependent on a change of the extent and which is preferably proportional to the modification and which acts counter to the modification. The term "wind deflector unit" in this context is intended to refer in particular to a unit which is provided to deflect travel wind acting on the wiping device and/or to use it to press the wiper lip onto a vehicle pane. The term "laterally" in this context is intended in particular to be understood to be originating from a wiping direction. The term "wiping direction" in this context is intended to be understood in particular to be a direction which extends parallel with a surface to be wiped and/or perpendicularly relative to a main orientation of the wiper blade. The term "provided" is intended in particular to be understood to be specifically configured and/or equipped.

In another embodiment of the invention, it is proposed that the wind deflector unit in the region of the longitudinal guiding channel be at least partially in abutment with a side of the retention element facing a wiping face, whereby the operational reliability can be increased.

If the wind deflector unit has at least one support web which is provided to transmit pressing forces of the wind deflector unit to the retention unit, the wiping device can be constructed so as to be particularly torsion resistant.

Production may advantageously be carried out in a cost-effective manner when the wind deflector unit is produced in a co-extrusion method. A "co-extrusion method" is intended in this context to be understood in particular to refer to the combination of at least two plastics material melts of different types before leaving a profile nozzle.

It is further proposed that the wind deflector unit have two wind deflector part-elements of different hardnesses, whereby weight can advantageously be reduced and strength can be increased.

If the harder wind deflector part-element laterally terminates the wind deflector unit, the softer wind deflector part-element can advantageously be protected from damage.

If the softer wind deflector part-element laterally terminates the wind deflector unit, the wiping device can be protected from an infiltration of fluid in a particularly simple manner.

If the softer wind deflector part-element has a longitudinal channel which comprises a triangular cross-section, material and weight can advantageously be saved. The term "triangular" in this context is intended to refer to a contour which has three corners. The corners may also be rounded depending on the application.

A particularly stable construction of the wiping device can be achieved when the retention element in at least one lateral region forms with the wind deflector unit a positive-locking connection which acts in a vertical direction. A "lateral region" in this context is intended to be understood in particular to be a region which is arranged at an outer end of the retention element facing a wiping direction. A "vertical direction" in this context is intended in particular to refer to a direction which extends perpendicularly relative to a surface to be wiped by the wiping device.

It is further proposed that the positive-locking connection be formed by at least one undercut within the retention element and a portion of the wind deflector unit engaging in the undercut, whereby a large contact face for force transmission can advantageously be formed within the wiping device.

BRIEF DESCRIPTION OF THE DRAWINGS

Other advantages will be appreciated from the following description of the drawings. Five embodiments of the invention are illustrated in the drawings. The drawings, the description and the claims contain a large number of features in combination. The person skilled in the art will also advantageously consider the features individually and combine them to form other advantageous combinations.

In the drawings.

DETAILED DESCRIPTION

Figure 1:
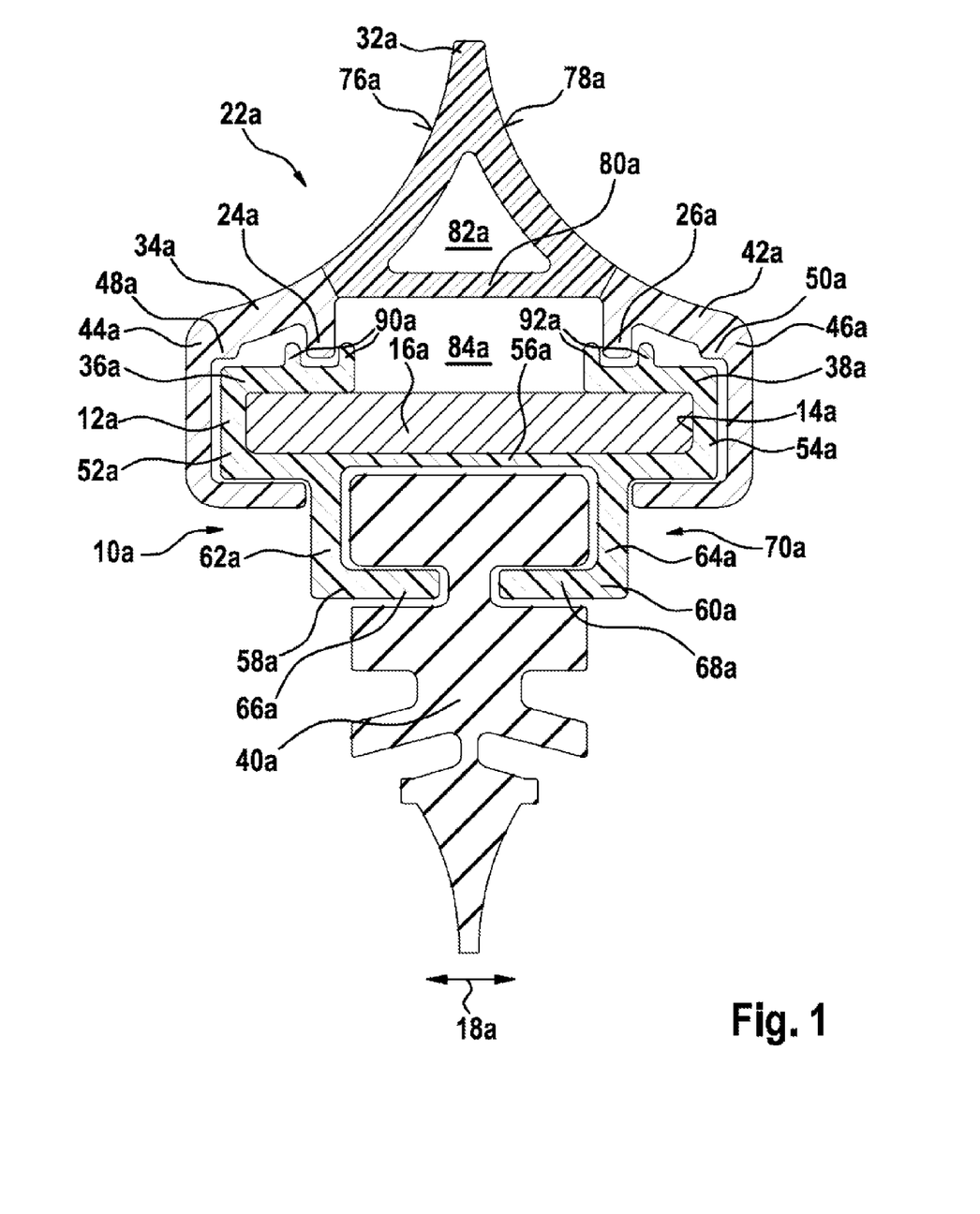
FIG. 1 is a cross-section of a wiping device having a retention unit.

FIG. 1 is a cross-section of a wiping device according to the invention having a retention unit 10a having a retention element 12a, which has a longitudinal guiding channel 14a for guiding a resilient element 16a, and having a wind deflector unit 22a. The plane of section extends perpendicularly relative to a longitudinal direction of the retention element 12a.

The retention unit 10a has channel walls 36a, 38a which are constructed integrally with the retention element 12a. The channel walls 36a, 38a adjoin the longitudinal guiding channel 14a at a side remote from the wiper blade. Two longitudinal continuations 90a, 92a are arranged on the channel walls 36a, 38a at a side remote from the wiper blade, respectively. The wind deflector unit 22a has two L-shaped securing means 44a, 46a and support members 48a, 50a which adjoin the securing means 44a, 46a.

In order to guide the resilient element 16a, lateral walls 52a, 54a of the longitudinal guiding channel 14a adjoin the channel walls 36a, 38a. The channel walls 36a, 38a in this instance form a right angle with respect to the lateral walls 52a, 54a. There is further arranged on the lateral walls 52a, 54a an intermediate wall 56a which terminates the longitudinal guiding channel 14a in the direction of a wiper blade 40a. The lateral walls 52a, 54a extend from the intermediate wall 56a in a direction orientated away from the wiper blade 40a. The retention element 12a has a longitudinal opening 84a, which opens the longitudinal guiding channel 14a with respect to the wind deflector unit 22a.

Two L-shaped guiding profiles 58a, 60a of the retention unit 10a are arranged on the intermediate wall 56a. The guiding profiles 58a, 60a are constructed integrally with the retention element 12a. The guiding profiles 58a, 60a each have a lateral guide 62a, 64a and each have a vertical guide 66a, 68a. The vertical guides 66a, 68a each form an angle of 90° with the lateral guides 62a, 64a. In this instance, the vertical guides 66a, 68a face each other. The lateral guides 62a, 64a each form an angle of 90° with respect to the intermediate wall 56a. The guiding profiles 58a, 60a are directed at their free ends of the vertical guides 66a, 68a in mutually facing directions. The guiding profiles 58a, 60a and the intermediate wall 56a form a weatherstrip rail 70a, in which the wiper blade 40a is introduced.

The retention element 12a is produced integrally from polyethylene in an extrusion method. A person skilled in the art will in this context consider various plastics materials which appear to be advantageous, such as, in particular, polypropylene, polyamide, polyvinyl chloride and/or polystyrene.

The wind deflector unit 22a is produced in a co-extrusion method from two wind deflector part-elements 32a, 34a, 42a having different hardnesses. The first wind deflector part-element 32a has two wind deflector sides 76a, 78a which are formed in a concave manner towards the outer side. In order to reinforce the wind deflector unit 22a, the first wind deflector part-element 32a has a connection web 80a which connects the concave wind deflector sides 76a, 78a to each other. The connection web 80a and the wind deflector sides 76a, 78a surround a longitudinal channel 82a, which has a triangular cross-section.

The first wind deflector part-element 32a is constructed integrally with the second wind deflector part-element 34a, 42a and is provided to deflect travel wind. The second wind deflector part-element 34a, 42a has a greater strength and hardness than the first wind deflector part-element 32a. The L-shaped securing means 44a, 46a and the support members 48a, 50a which adjoin the securing means 44a, 46a are formed on the second wind deflector part-element 34a, 42a. The harder wind deflector part-element 34a, 42a of the wind deflector unit 22a laterally abuts the retention element 12a in the region of the longitudinal guiding channel 14a. Furthermore, the harder wind deflector part-element 34a, 42a of the wind deflector unit 22a in the region of the longitudinal guiding channel 14a abuts a side of the retention element 12a facing the wiper blade 40a.

Furthermore, the second wind deflector part-element 34a, 42a has two support webs 24a, 26a. The support webs 24a, 26a abut with the free ends thereof the channel walls 36a, 38a at a side remote from the wiper blade 40a. The support webs 24a, 26a are provided in order to transmit pressing forces, which occur at the wind deflector unit 22a when travel wind is applied. The support webs 24a, 26a extend over the entire length of the wind deflector unit 22a. The longitudinal continuations 90a, 92a are in abutment with the support webs 24a, 26a in each case in a wiping direction 18a.

The resilient element 16a is introduced into the longitudinal guiding channel 14a. The resilient element 16a is produced from a spring steel and provided to form the retention unit 10a so as to be able to be resiliently deflected.

For assembly, the resilient element 16a is first introduced into the longitudinal guiding channel 14a. Subsequently, the wiper blade 40a is inserted into the weatherstrip rail 70a and forms a positive-locking connection with the retention element 12a. The wind deflector unit 22a is now pushed over the retention element 12a and is then connected thereto in a positive-locking manner.

FIGS. 2 to 5 show four other embodiments of the invention. The following descriptions are limited substantially to the differences between the embodiments, it being possible to refer to the description of the first embodiment with respect to components, features and functions which remain the same. In order to differentiate between the embodiments, the letter a in the reference numerals of the embodiment in FIG. 1 is replaced by the letters b to e in the reference numerals of the embodiments of FIGS. 2 to 5. With respect to components which have the same designation, in particular with reference to components having the same reference numerals, reference can in principle also be made to the drawings and/or the description of the first embodiment.

Figure 2:
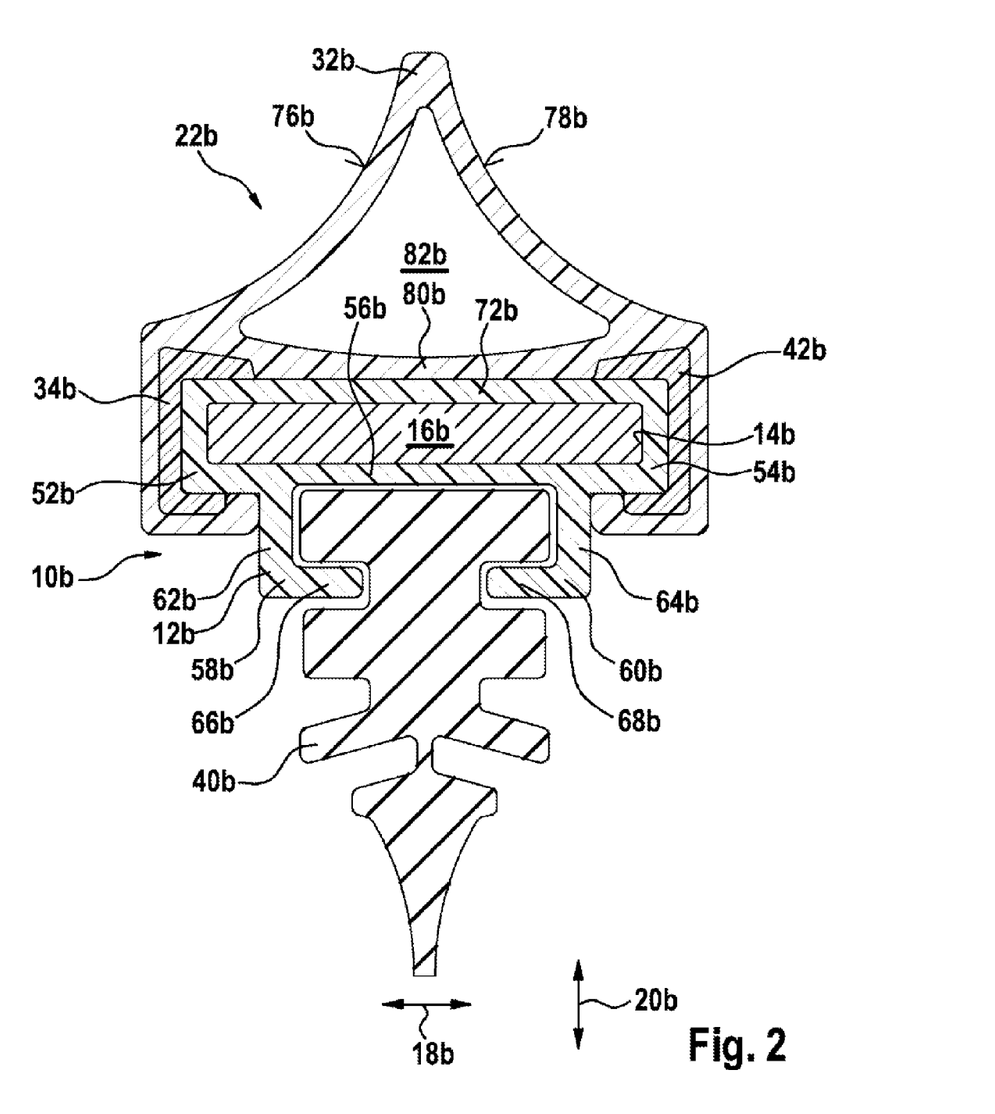
FIG. 2 is a cross-section of another embodiment of a wiping device having a retention unit.

FIG. 2 is a cross-section of another embodiment of a wiping device according to the invention having a retention unit 10b with a retention element 12b, which has a longitudinal guiding channel 14b for guiding a resilient element 16b and having a wind deflector unit 22b. The plane of section extends perpendicularly relative to a longitudinal direction of the retention element 12b.

In order to guide the resilient element 16b, the longitudinal guiding channel 14b has lateral walls 52b, 54b. At the lateral walls 52b, 54b, there is further arranged an intermediate wall 56b, which terminates the longitudinal guiding channel 14b in the direction of a wiper blade 40b. The lateral walls 52b, 54b extend from the intermediate wall 56b in a direction away from the wiper blade 40b. A second intermediate wall 72b terminates the longitudinal guiding channel 14b in the direction of the wind deflector unit 22b. The longitudinal guiding channel 14b is consequently completely surrounded.

Two L-shaped guiding profiles 58b, 60b of the retention unit 10b are arranged on the intermediate wall 56b. The guiding profiles 58b, 60b are constructed integrally with the retention element 12b. The guiding profiles 58b, 60b each have a lateral guide 62b, 64b and a vertical guide 66b, 68b.

The vertical guides 66b, 68b each form an angle of 90° with the lateral guides 62b, 64b. In this instance, the vertical guides 66b, 68b face each other. The lateral guides 62b, 64b each form an angle of 90° with respect to the intermediate wall 56b. The guiding profiles 58b, 60b are directed at their free ends of the vertical guides 66b, 68b in mutually facing directions. The guiding profiles 58b, 60b and the intermediate wall 56b form a weatherstrip rail 70b, in which the wiper blade 40b is inserted.

The wind deflector unit 22b is produced in a co-extrusion method from two wind deflector part-elements 32b, 34b, 42b having different hardnesses. The first wind deflector part-element 32b has two wind deflector sides 76b, 78b which are formed in a concave manner towards the outer side. In order to reinforce the wind deflector unit 22b, the first wind deflector part-element 32b has a connection web 80b which connects the concave wind deflector sides 76b, 78b to each other. The connection web 80b and the wind deflector sides 76b, 78b surround a longitudinal channel 82b, which has a substantially pentagonal cross-section.

The first wind deflector part-element 32b is constructed integrally with the second wind deflector part-element 34b, 42b and is provided in order to deflect travel wind. The second wind deflector part-element 34b, 42b has a higher level of strength and hardness than the first wind deflector part-element 32b.

The second wind deflector part-elements 34b, 42b of the wind deflector unit 22b laterally abut the retention element 12b in the region of the longitudinal guiding channel 14b in a positive-locking manner. The second wind deflector part-elements 34b, 42b of the wind deflector unit 22b further abut in the region of the longitudinal guiding channel 14b a side of the retention element 12b which faces the wiper blade 40b. The wind deflector part-elements 34b, 42b consequently abut the retention element 12b in a positive-locking manner in the region of the longitudinal guiding channel 14b and engage around the longitudinal guiding channel 14b. The second wind deflector part-elements 34b, 42b each have three walls. The first and the second wall form an angle of 90°. The second wall forms with the third wall an angle of 77°, which can lead to great torsion-resistance.

Both in a wiping direction 18b and in a vertical direction 20b, the second wind deflector part-elements 34b, 42b abut the first wind deflector part-element 32b. Contact of the second wind deflector part-elements 34b, 42b with an environment is consequently prevented. The softer wind deflector part-element 32b laterally terminates the wind deflector unit 22b.

The retention element 12b is produced integrally from polyethylene in an extrusion method. A person skilled in the art will in this context consider various plastics materials which appear to be advantageous, such as, in particular, polypropylene, polyamide, polyvinyl chloride and/or polystyrene.

The resilient element 16b is introduced into the longitudinal guiding channel 14b. The resilient element 16b is produced from a spring steel and is provided to form the retention unit 10b so as to be able to be resiliently deflected.

For assembly, the resilient element 16b is first introduced into the longitudinal guiding channel 14b. Subsequently, the wiper blade 40b is inserted into the weatherstrip rail 70b and forms a positive-locking connection with the retention element 12b. The wind deflector unit 22b is now pushed over the retention element 12b and is then connected thereto in a positive-locking manner.

Figure 3:
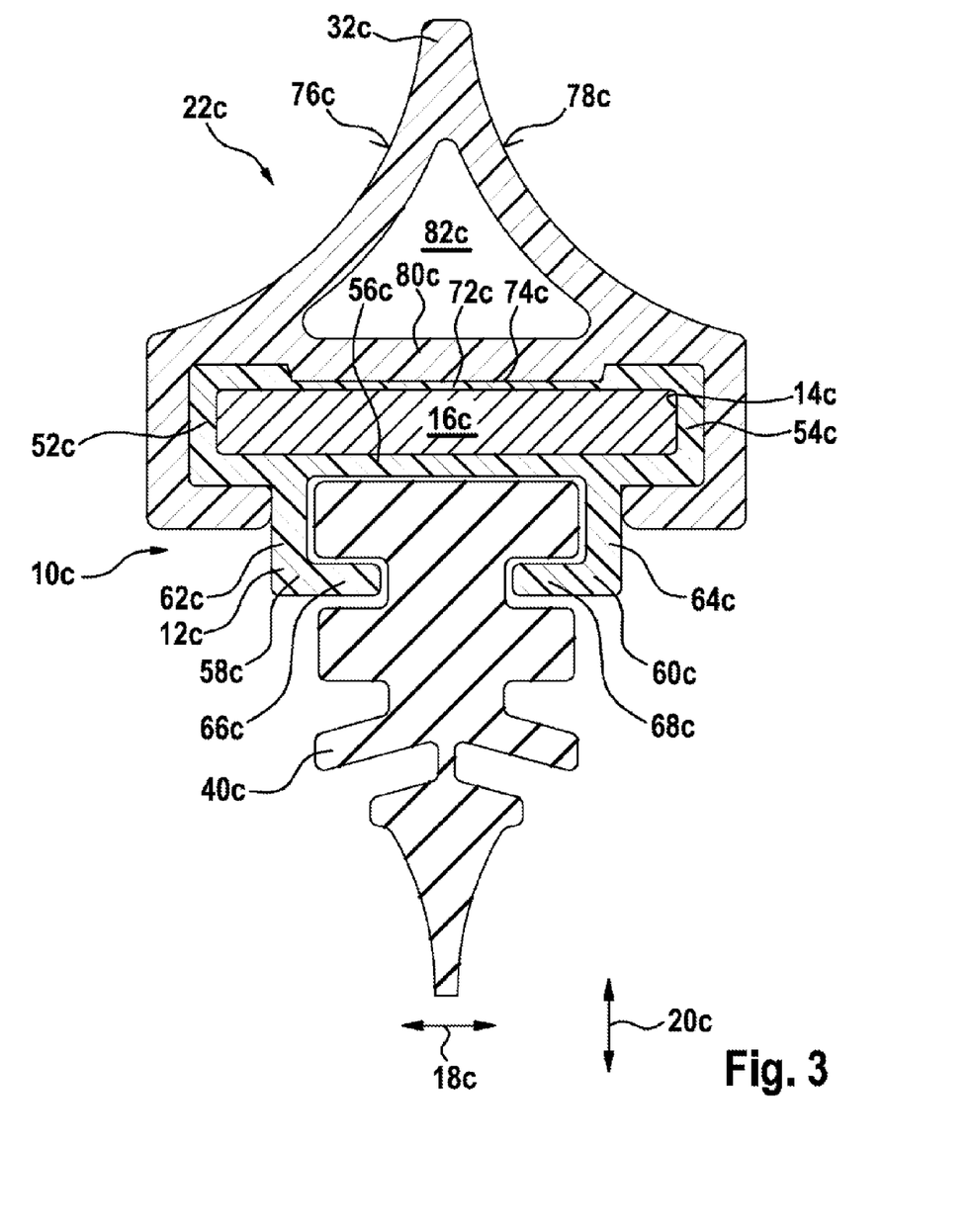
FIG. 3 is a cross-section of another embodiment of a wiping device having a retention unit.

FIG. 3 is a cross-section of another embodiment of a wiping device according to the invention having a retention unit 10c having a retention element 12c, which has a longitudinal guiding channel 14c for guiding a resilient element 16c, and having a wind deflector unit 22c. The plane of section extends perpendicularly relative to a longitudinal direction of the retention element 12c.

In order to guide the resilient element 16c, the longitudinal guiding channel 14c has lateral walls 52c, 54c. There is further arranged on the lateral walls 52c, 54c an intermediate wall 56c which terminates the longitudinal guiding channel 14c in the direction of a wiper blade 40c. The lateral walls 52c, 54c extend from the intermediate wall 56c in a direction away from the wiper blade 40c. A second intermediate wall 72c terminates the longitudinal guiding channel 14c in the direction of the wind deflector unit 22c. The longitudinal guiding channel 14c is consequently completely surrounded.

Two L-shaped guiding profiles 58c, 60c of the retention unit 10c are arranged on the intermediate wall 56c. The guiding profiles 58c, 60c are constructed integrally with the retention element 12c. The guiding profiles 58c, 60c each have a lateral guide 62c, 64c and a vertical guide 66c, 68c. The vertical guides 66c, 68c each form an angle of 90° with the lateral guides 62c, 64c. In this instance, the vertical guides 66c, 68c face each other. The lateral guides 62c, 64c each form an angle of 90° with respect to the intermediate wall 56c. The guiding profiles 58c, 60c are directed at their free ends of the vertical guides 66c, 68c in mutually facing directions. The guiding profiles 58c, 60c and the intermediate wall 56c form a weatherstrip rail 70c, in which the wiper blade 40c is inserted.

The wind deflector unit 22c is produced in an extrusion method and has a wind deflector part-element 32c. The wind deflector part-element 32c has two wind deflector sides 76c, 78c which are constructed in a concave manner towards the outer side. In order to reinforce the wind deflector unit 22c, the wind deflector part-element 32c has a connection web 80c which connects the concave wind deflector sides 76c, 78c to each other. The connection web 80c and the wind deflector sides 76c, 78c surround a longitudinal channel 82c which has a substantially triangular cross-section. The connection web 80c is partially inserted into a recess 74c of the second intermediate wall 72c and consequently forms with the second intermediate wall 72c a positive-locking connection which acts in a wiping direction 18c.

The wind deflector part-element 32c is provided to deflect travel wind. The wind deflector part-element 32c of the wind deflector unit 22c laterally abuts the retention element 12c in the region of the longitudinal guiding channel 14c in a positive-locking manner. The wind deflector part-element 32c of the wind deflector unit 22c further abuts in the region of the longitudinal guiding channel 14c a side of the retention element 12c facing the wiper blade 40c. The wind deflector part-element 32c consequently abuts the retention element 12c in a positive-locking manner in the region of the longitudinal guiding channel 14c and surrounds the longitudinal guiding channel 14c. The softer wind deflector part-element 32c laterally terminates the wind deflector unit 22c.

The retention element 12c is produced integrally from polyethylene. A person skilled in the art will in this context consider various plastics materials which appear to be advantageous, such as, in particular, polypropylene, polyamide, polyvinyl chloride and/or polystyrene.

The resilient element 16c is introduced into the longitudinal guiding channel 14c. The resilient element 16c is produced from a spring steel and is provided to form the retention unit 10c so as to be able to be resiliently deflected.

For assembly, the resilient element 16c is first introduced into the longitudinal guiding channel 14c. Subsequently, the wiper blade 40c is inserted into the weatherstrip rail 70c and forms a positive-locking connection with the retention element 12c. The wind deflector unit 22c is now pushed over the retention element 12c and is then connected thereto in a positive-locking manner.

Figure 4:
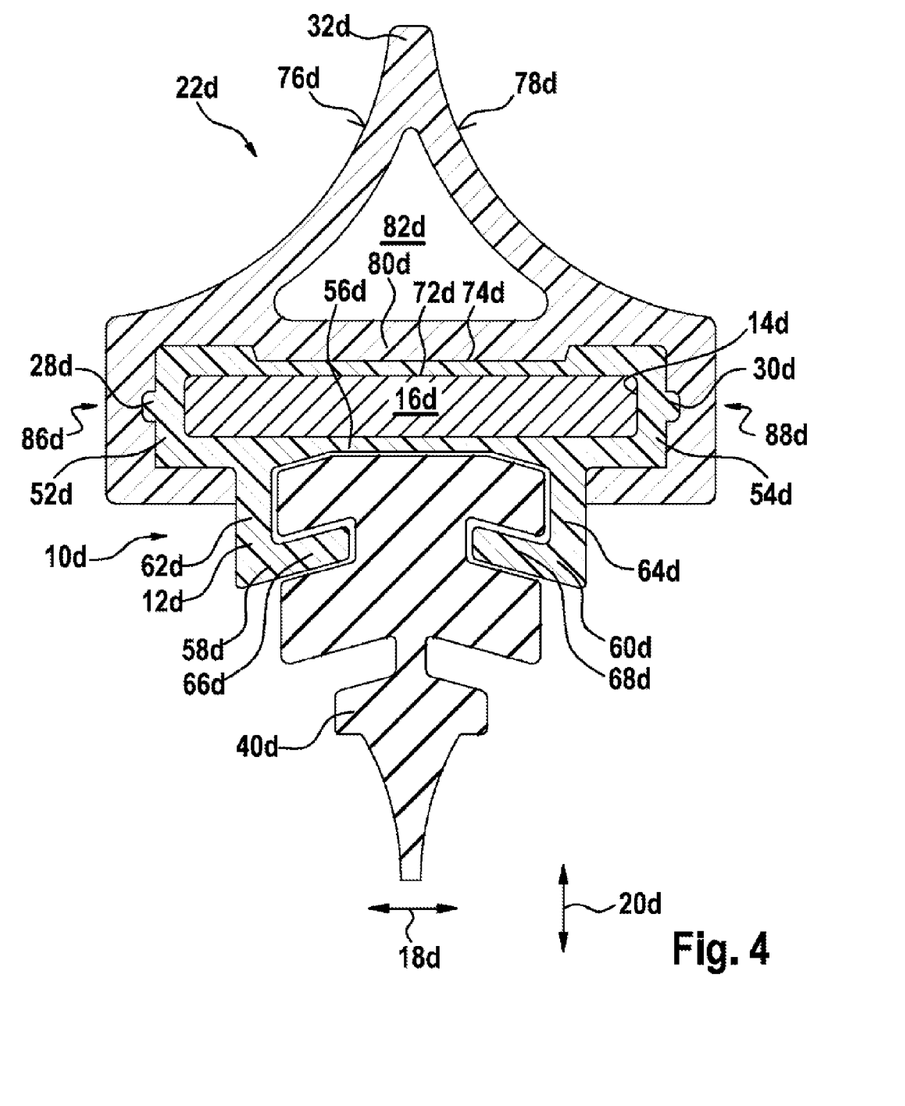
FIG. 4 is a cross-section of another embodiment of a wiping device having a retention unit.

FIG. 4 is a cross-section of another embodiment of a wiping device according to the invention having a retention unit 10d having a retention element 12d, which has a longitudinal guiding channel 14d for guiding a resilient element 16d, and having a wind deflector unit 22d. The plane of section extends perpendicularly relative to a longitudinal direction of the retention element 12d.

In order to guide the resilient element 16d, the longitudinal guiding channel 14d has lateral walls 52d, 54d. There is further arranged on the lateral walls 52d, 54d an intermediate wall 56d which terminates the longitudinal guiding channel 14d in the direction of a wiper blade 40d. The lateral walls 52d, 54d extend from the intermediate wall 56d in a direction away from the wiper blade 40d. A second intermediate wall 72d terminates the longitudinal guiding channel 14d in the direction of the wind deflector unit 22d. The longitudinal guiding channel 14d is consequently completely surrounded. A lateral strip 28d, 30d is formed in each case on the lateral walls 52d, 54d.

Two guiding profiles 58d, 60d of the retention unit 10d are arranged on the intermediate wall 56d. The guiding profiles 58d, 60d are constructed integrally with the retention element 12d. The guiding profiles 58d, 60d each have a lateral guide 62d, 64d and a vertical guide 66d, 68d. The vertical guides 66d, 68d each form an acute angle of 77° with the lateral guides 62d, 64d. In this instance, the vertical guides 66d, 68d face each other. The lateral guides 62d, 64d each form an angle of 90° with respect to the intermediate wall 56d. The guiding profiles 58d, 60d are directed at their free ends of the vertical guides 66d, 68d in mutually facing directions. The guiding profiles 58d, 60d and the intermediate wall 56d form a weatherstrip rail 70d, in which the wiper blade 40d is inserted.

The wind deflector unit 22d is produced in an extrusion method and has a wind deflector part-element 32d. The wind deflector part-element 32d has two wind deflector sides 76d, 78d which are constructed in a concave manner towards the outer side. In order to reinforce the wind deflector unit 22d, the wind deflector part-element 32d has a connection web 80d which connects the concave wind deflector sides 76d, 78d to each other. The connection web 80d and the wind deflector sides 76d, 78d surround a longitudinal channel 82d which has a substantially triangular cross-section. The connection web 80d is partially inserted into a recess 74d of the second intermediate wall 72d and consequently forms with the second intermediate wall 72d a positive-locking connection which acts in a wiping direction 18d.

The wind deflector part-element 32d is provided to deflect travel wind. The wind deflector part-element 32d of the wind deflector unit 22d laterally abuts the retention element 12d in the region of the longitudinal guiding channel 14d in a positive-locking manner. The wind deflector part-element 32d of the wind deflector unit 22d further abuts in the region of the longitudinal guiding channel 14d a side of the retention element 12d facing the wiper blade 40d. The wind deflector part-element 32d consequently abuts the retention element 12d in a positive-locking manner in the region of the longitudinal guiding channel 14d and surrounds the longitudinal guiding channel 14d. The wind deflector part-element 32d laterally terminates the wind deflector unit 22d.

In this instance, the wind deflector part-element 32d surrounds the lateral bars 28d, 30d of the retention element 12d in two lateral regions 86d, 88d. Consequently, the retention element 12d forms with the wind deflector unit 22d in the lateral regions 86d, 88d a positive-locking connection which acts in a vertical direction 20d.

The retention element 12d is produced integrally from polyethylene. A person skilled in the art will in this context consider various plastics materials which appear to be advantageous, such as, in particular, polypropylene, polyamide, polyvinyl chloride and/or polystyrene.

The resilient element 16d is introduced into the longitudinal guiding channel 14d. The resilient element 16d is produced from a spring steel and is provided to form the retention unit 10d so as to be able to be resiliently deflected.

For assembly, the resilient element 16d is first introduced into the longitudinal guiding channel 14d. Subsequently, the wiper blade 40d is inserted into the weatherstrip rail 70d and forms a positive-locking connection with the retention element 12d. The wind deflector unit 22d is now pushed over the retention element 12d and is then connected thereto in a positive-locking manner.

Figure 5:
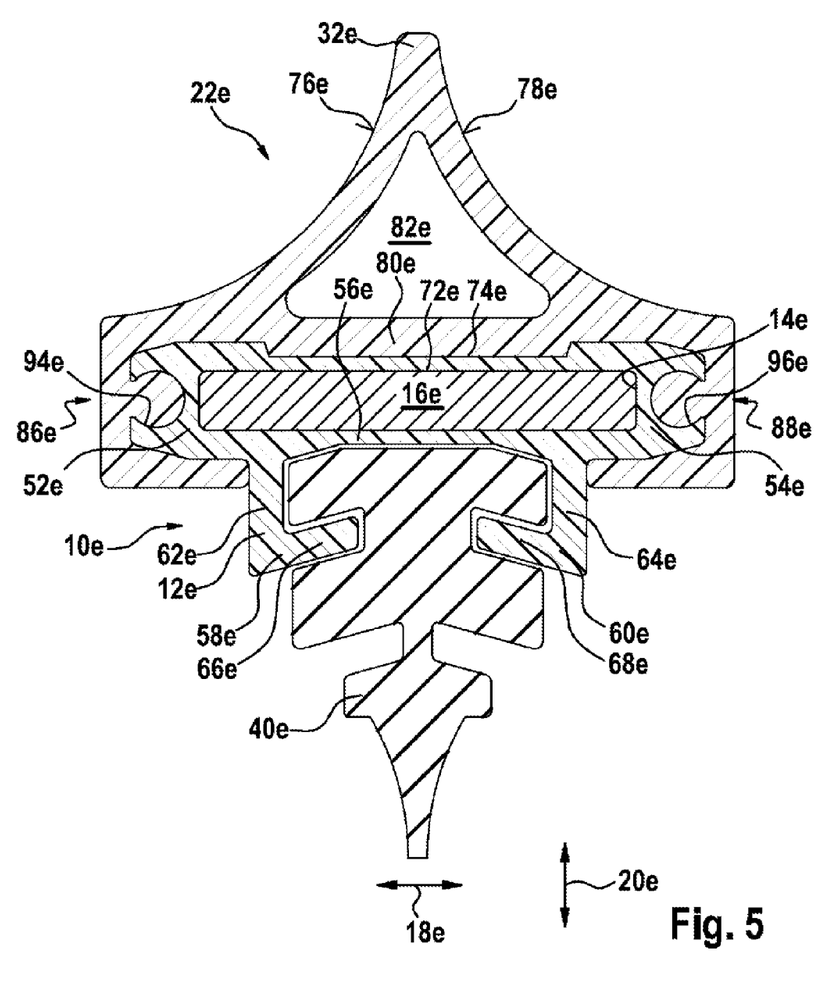
FIG. 5 is a cross-section of another embodiment of a wiping device having a retention unit.

FIG. 5 is a cross-section of another embodiment of a wiping device according to the invention having a retention unit 10e having a retention element 12e, which has a longitudinal guiding channel 14e for guiding a resilient element 16e, and having a wind deflector unit 22e. The plane of section extends perpendicularly relative to a longitudinal direction of the retention element 12e.

In order to guide the resilient element 16e, the longitudinal guiding channel 14e has lateral walls 52e, 54e. There is further arranged on the lateral walls 52e, 54e an intermediate wall 56e which terminates the longitudinal guiding channel 14e in the direction of a wiper blade 40e. The lateral walls 52e, 54e extend from the intermediate wall 56e in a direction away from the wiper blade 40e. A second intermediate wall 72e terminates the longitudinal guiding channel 14e in the direction of the wind deflector unit 22e. The longitudinal guiding channel 14e is consequently completely surrounded. In the lateral walls 52e, 54e there is in each case arranged in a lateral region 86e, 88e an undercut 94e, 96e which connects the wind deflector unit 22e to the retention element 12e in a positive-locking manner in a wiping direction 18e. The undercuts 94e, 96e are constructed in a C-shaped manner and have a cross-section which tapers in the direction towards an opening.

Two guiding profiles 58e, 60e of the retention unit 10e are arranged on the intermediate wall 56e. The guiding profiles 58e, 60e are constructed integrally with the retention element 12e. The guiding profiles 58e, 60e each have a lateral guide 62e, 64e and a vertical guide 66e, 68e. The vertical guides 66e, 68e each form an acute angle of 77° with the lateral guides 62e, 64e. In this instance, the vertical guides 66e, 68e face each other. The lateral guides 62e, 64e each form an angle of 90° with respect to the intermediate wall 56e. The guiding profiles 58e, 60e are directed at their free ends of the vertical guides 66e, 68e in mutually facing directions. The guiding profiles 58e, 60e and the intermediate wall 56e form a weatherstrip rail 70e, in which the wiper blade 40e is inserted.

The wind deflector unit 22e is produced in an extrusion method and has a wind deflector part-element 32e. The wind deflector part-element 32e has two wind deflector sides 76e, 78e which are constructed in a concave manner towards the outer side. In order to reinforce the wind deflector unit 22e, the wind deflector part-element 32e has a connection web 80e which connects the concave wind deflector sides 76e, 78e to each other. The connection web 80e and the wind deflector sides 76e, 78e surround a longitudinal channel 82e which has a substantially triangular cross-section. The connection web 80e is partially inserted into a recess 74e of the second intermediate wall 72e and consequently forms with the second intermediate wall 72e a positive-locking connection which acts in a wiping direction 18e.

The wind deflector part-element 32e is provided to deflect travel wind. The wind deflector part-element 32e of the wind deflector unit 22e laterally abuts the retention element 12e in the region of the longitudinal guiding channel 14e in a positive-locking manner. The wind deflector part-element 32e of the wind deflector unit 22e further abuts in the region of the longitudinal guiding channel 14e a side of the retention element 12e facing the wiper blade 40e. The wind deflector part-element 32e consequently abuts the retention element 12e in a positive-locking manner in the region of the longitudinal guiding channel 14e and surrounds the longitudinal guiding channel 14e. The wind deflector part-element 32e laterally terminates the wind deflector unit 22e. The wind deflector part-element 32e engages in the undercuts 94e, 96e and completely fills them. Consequently, the retention element 12e forms with the wind deflector unit 22e in the lateral regions 86e, 88e a positive-locking connection which acts in the wiping direction 18e and in a vertical direction 20e.

The retention element 12e is produced integrally from polyethylene. A person skilled in the art will in this context consider various plastics materials which appear to be advantageous, such as, in particular, polypropylene, polyamide, polyvinyl chloride and/or polystyrene.

The resilient element 16e is introduced into the longitudinal guiding channel 14e. The resilient element 16e is produced from a spring steel and is provided to form the retention unit 10e so as to be able to be resiliently deflected.

For assembly, the resilient element 16e is first introduced into the longitudinal guiding channel 14e. Subsequently, the wiper blade 40e is inserted into the weatherstrip rail 70e and forms a positive-locking connection with the retention element 12e. The wind deflector unit 22e is now pushed over the retention element 12e and is then connected thereto in a positive-locking manner.

What is claimed is:

1. A wiping device, comprising a retention unit (10a-10e) which has a retention element (12a-12e) having a longitudinal guiding channel (14a-14e) for guiding a resilient element (16a-16e) along a longitudinal plane, and a wind deflector unit (22a-22e), characterized in that the wind deflector unit (22a-22e) is at least partially in lateral abutment with the retention element (12a-12e) in a region of the longitudinal guiding channel (14a-14e), wherein the wind deflector unit (22a) includes a first support web (24a) which is provided to transmit pressing forces of the wind deflector unit (22a) directly to the retention unit (10a) along a direction extending from the wind deflector unit (22a) toward the longitudinal guide channel (14a-14e) and perpendicular to the longitudinal plane, and wherein the retention unit (10a) includes two first protrusions (90a) that define a first channel for receiving the first support web (24a), and wherein the wind deflector unit (22a) includes a second support web (26a) which is provided to transmit pressing forces of the wind deflector unit (22a) directly to the retention unit (10a) along a direction extending from the wind deflector unit (22a) toward the longitudinal guide channel (14a-14e) and perpendicular to the longitudinal plane, wherein the retention unit (10a) includes two second protrusions (92a) that define a second channel for receiving the second support web (26a), wherein the two first protrusions (90a) and the two second protrusions (92a) define four separately spaced protrusions that are spaced apart from one another by gaps along a wiping direction (18a) of the wiping device, the wiping direction (18a) being parallel to the longitudinal plane, wherein each of the two first protrusions (90a) and the two second protrusions (92a) extends upwardly in a direction perpendicular to and away from the longitudinal plane, and wherein each of the first support web (24a) and the second support web (26a) extends downwardly in a direction perpendicular to and toward the longitudinal plane.

2. The wiping device as claimed in claim 1, characterized in that the wind deflector unit (22a-22e) in the region of the longitudinal guiding channel (14a-14e) is at least partially in abutment with a side of the retention element (12a-12e) facing a wiper blade (40a-40e).

3. The wiping device as claimed in claim 1, characterized in that the wind deflector unit (22a; 22b) is produced in a co-extrusion method.

4. The wiping device as claimed in claim 1, characterized in that the wind deflector unit (22a-22e) has two wind deflector part-elements (32a-32e; 34a-34e) of different hardnesses.

5. The wiping device as claimed in claim 4, characterized in that a harder wind deflector part-element (34a) laterally terminates the wind deflector unit (22a).

6. The wiping device as claimed in claim 1, wherein the two first protrusions (90a) are separated from the two second protrusions (92a) by a longitudinal opening (84a) in the retention element (12a).

7. The wiping device as claimed in claim 1, further comprising a wiper blade (40a-40e) coupled to the retention element (12a-12e), wherein the longitudinal guide channel (14a-14e) is disposed between the wiper blade (40a-40e) and each of the two first protrusions (90a), the two second protrusions (92a), the gaps, the first support web (24a), and the second support web (26a).

8. The wiping device as claimed in claim 7, wherein the retention element (12a-12e) also includes channel walls (36a, 38a) that extend inwardly toward each other and adjoin the longitudinal guide channel (14a) at a side remote from the wiper blade, wherein the two first protrusions (90a) extend upwardly from one of the channel walls (36a) and wherein the two second protrusions (92a) extend upwardly from the other of the channel walls (38a).

9. The wiping device as claimed in claim 8, further comprising a resilient element (16a-16e) disposed within the longitudinal guide channel (14a-14e), wherein the channel walls extend above the resilient element (16a-16e) that is disposed within the longitudinal guide channel (14a-14e), and wherein ends of the channel walls are spaced apart and partially define a longitudinal opening (84a) in the retention element (12a-12e).

10. The wiping device as claimed in claim 9, wherein the retention element (12a-12e) also includes an intermediate wall (56a) between the longitudinal guide channel (14a-14e) and the wiper blade (40a-40e).

* * * * *